May 23, 1972

G. W. BROWN 3,664,791

APPARATUS FOR CONTROLLING THE SAGGING OF A THERMOPLASTIC
SYNTHETIC PLASTIC WEB BEING FED THROUGH A
THERMOFORMING MACHINE

Filed Jan. 5, 1970

INVENTOR.
GAYLORD W. BROWN

BY

Learman & McCulloch

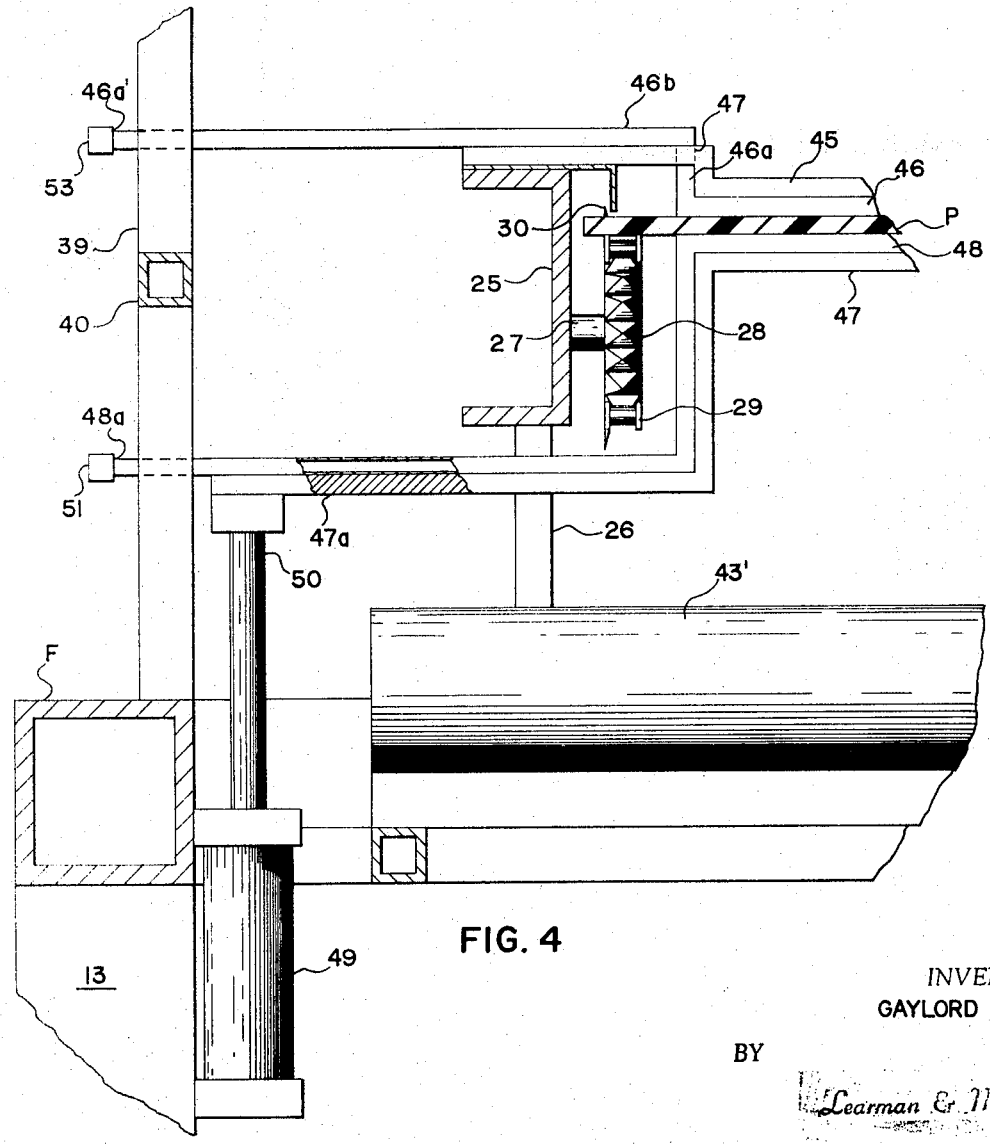

United States Patent Office 3,664,791
Patented May 23, 1972

3,664,791
APPARATUS FOR CONTROLLING THE SAGGING OF A THERMOPLASTIC SYNTHETIC PLASTIC WEB BEING FED THROUGH A THERMOFORMING MACHINE
Gaylord W. Brown, Beaverton, Mich., assignor to Koehring Company, Milwaukee, Wis.
Filed Jan. 5, 1970, Ser. No. 699
Int. Cl. B29c *17/00*
U.S. Cl. 425—156
7 Claims

ABSTRACT OF THE DISCLOSURE

A system for preventing the undue sagging of a plastic sheet proceeding through heating apparatus to a forming mold station wherein the web is advanced in a longitudinal pathway past heaters for raising the web to a forming temperature prior to moving it to the forming mold station, and transversely extending, cooled clamp frames for gripping the web at longitudinally spaced intervals are provided and function to inhibit the sagging of the web which would otherwise occur by gripping the web and maintaining comparatively rigid longitudinally spaced apart strips in the web upstream of the mold station, during the time the mold mechanism is closed, to form articles in the plastic web.

---

This invention relates particularly to differential pressure forming machines and a system for overcoming problems concerned with sag created in the interior portions of the web in which the articles are formed by the ovens which raise the web to a thermoforming temperature as the web is carried along by advancing mechanism which grips its outer side edges. Undue sagging in a sheet occurs when certain areas of the sheet stretch and "thin out" relative to other areas, and consequently articles formed in the web or sheet are not uniform in thickness and have unacceptable thin spots.

Presently the side edges of the plastic sheet, which are gripped by advancing chains in conventional differential pressure forming machinery, are protected from being heated more than is desired in the manner disclosed in the present assignees United States Pat. No. 3,216,491. The interior areas of the web must be heated to thermoforming temperatures, however, and tend to sag under their own weight. It has been conventional practice to provide longitudinally extending, endless sag bands for supporting the mediate portions of the web in the manner disclosed in the R. K. Shelby et al. U.S. Pat. No. 2,967,-328. The use of such sag bands creates maintenance problems and is not entirely satisfactory for many reasons, and the industry has for some time sought a different solution. The system which will be described, employs a new concept and maintains integral support strips or ribs in the web which function to inhibit undue sagging without the need of a longitudinally traveling sag band assembly or some other form of external support.

One of the prime objects of the invention is to maintain longitudinally spaced, sag controlling strips in a synthetic plastic web as it is being heated prior to being passed between the usual mold mechanism elements, and to do so at a time when the sheet advancing mechanism is inoperative and the sheet is temporarily in a stationary position relative to the mold mechanism which is to form articles such as containers or the like in the web.

A further object of the invention is to maintain sag inhibiting strips in the plastic sheet which do not in any way interfere with the subsequent molding operation.

Still another object of the invention is to provide an apparatus and method of the character described which is relatively economical to manufacture and operate, and does not require the maintenance formerly required by sag band supports.

Other objects and advantages of the invention will become apparent to those skilled in the art upon studying the following specification in conjunction with the drawings in which:

FIG. 4 is a greatly enlarged, fragmentary view of the apparatus shown encircled in FIG. 3;

Figure 5:
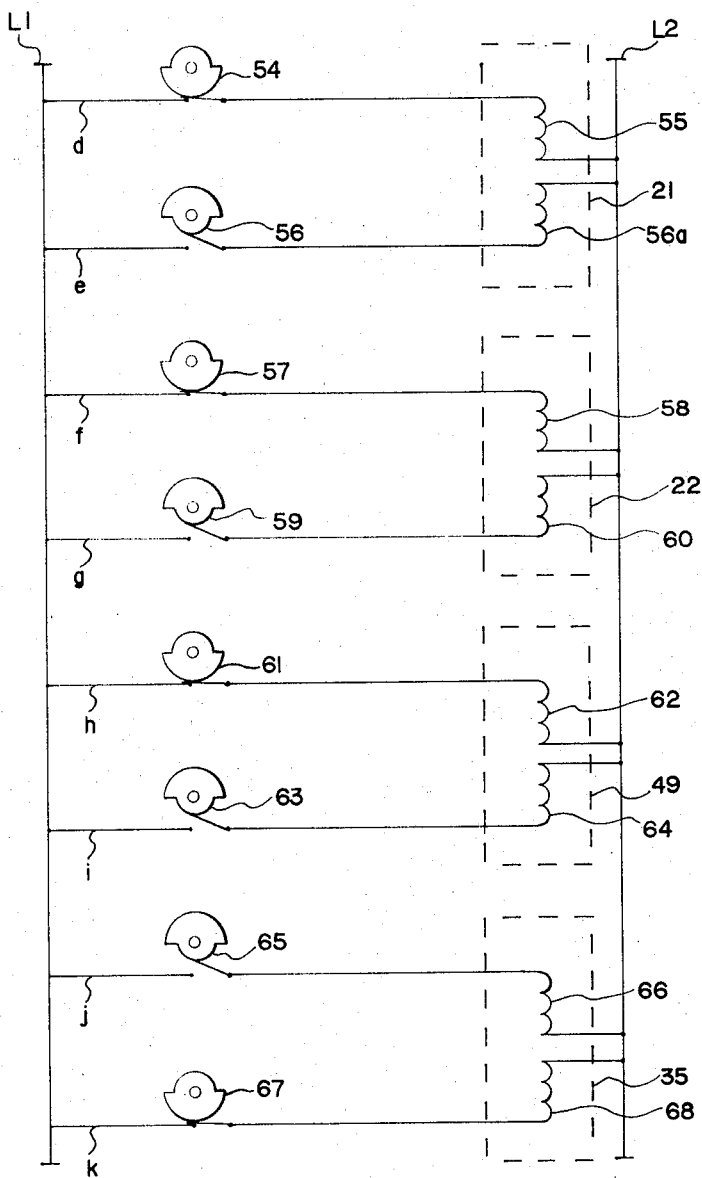

FIG. 5 schematically discloses an electrical control system for the machine;

FIG. 6 is a top plan view with the chain lines illustrating portions of the plastic web which are "set" and rigid relative to the other portions;

FIG. 7 is a diagrammatic side elevational view showing a typical plastic web portion without sag controlling strips formed therein and illustrating the sag developed due to the weight of the web; and FIG. 8 is a similar view but showing a plastic web which has the sag controlling strips maintained therein.

Briefly, the invention is concerned with the provision of cooled clamp frames which grip the plastic web at predetermined intervals while it is being raised to a softened molding temperature in oven apparatus upstream of a molding station. Longitudinally spaced apart clamp frames located at predetermined intervals operate to chill the sheet and maintain somewhat rigidified or "set" transversely extending strips in the sheet which inhibit the sagging of the softened material which otherwise normally occurs due to the weight of the unsupported mediate portions of the sheet.

Figure 1:
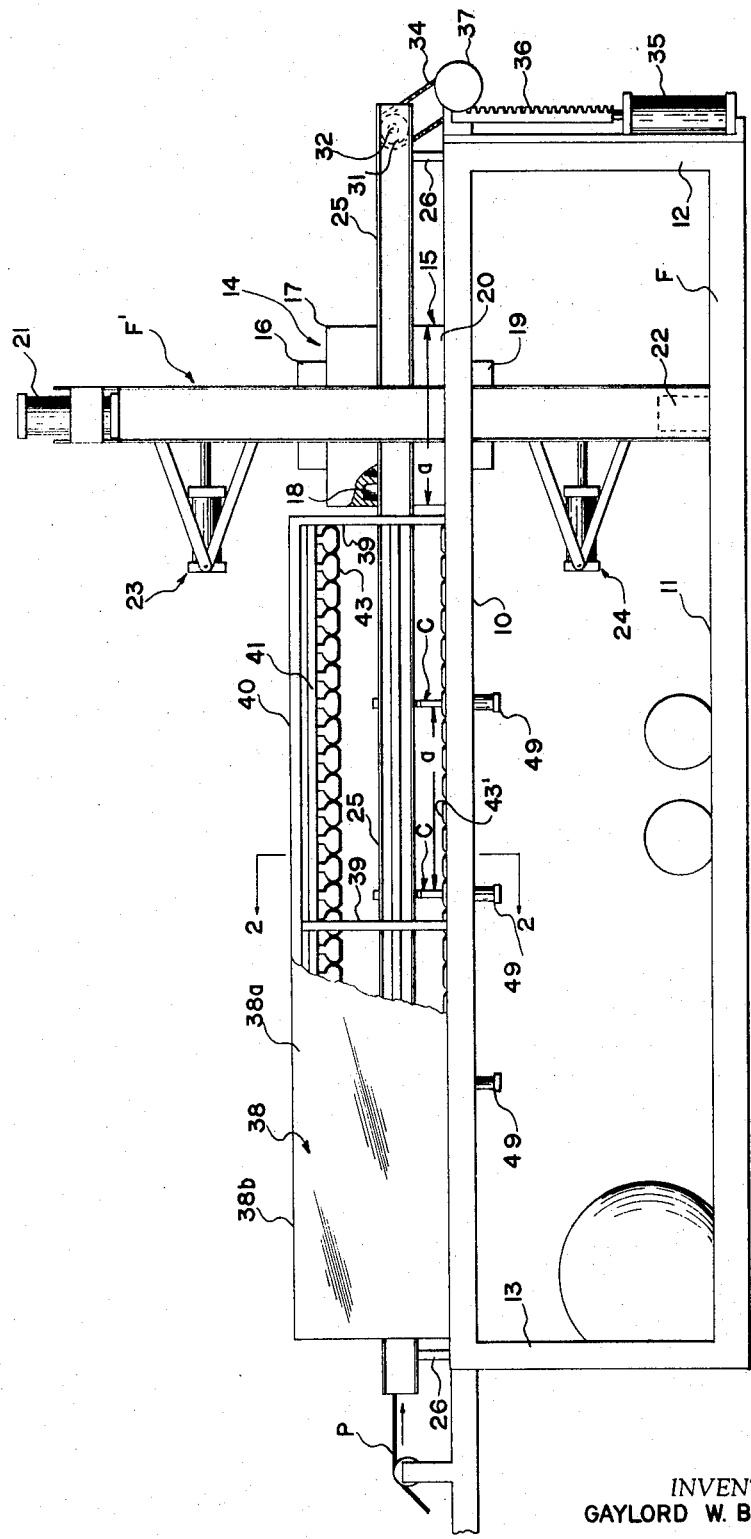
FIG. 1 is a partly interiorly exposed side elevational view of a typical differential pressure forming machine incorporating the invention.

Referring now more particularly to the accompanying drawings, a differential pressure thermoforming machine similar to that described in some detail in the present assignee's United States Pat. 3,346,923 issued Oct. 17, 1967 for a differential pressure forming machine is disclosed in FIG. 1, and includes a frame F comprising upper and lower longitudinal members 10 and 11, respectively, joined at their ends by front and rear vertical members 12 and 13, respectively, at each side of the machine. The end members 12 and 13 on each side of the machine are jointed by cross brace members 14 in the usual fashion.

Supported by the prefabricated frame F is a platen supporting sub-frame, generally designated F', which may be of the character disclosed in the aforementioned United States patent which is incorporated herein by reference. The frame F' similarly mounts an upper mold assembly, generally designated 14, and a lower mold assembly generally designated 15. Specifically the upper mold assembly 14 includes an upper platen 16 and a female mold 17 including mold cavities 18. The lower mold assembly 15 may specifically comprise a lower platen 19 which mounts an air box mold 20 having plug assist members in the manner illustrated in the patent mentioned. At the upper and lower ends of the sub-frame F', actuating fluid pressure operated cylinders 21 and 22 are provided which move the platens 16 and 19 toward and away from the plastic web P which is indexed between the mold assemblies 14 and 15 when they are in separated position in a manner which will later become apparent. The cylinders 21 and 22 may be, as in the patent mentioned, double acting air cylinders and, also as in the patent mentioned, toggle assemblies 23 and 24 may be utilized in the manner described in the patent to prevent the differential pressures developed in forming from separating the mold assemblies 14 and 15 during the forming operation. The structure and operation of the locking toggle assemblies 23 and 24 are well described in the patent mentioned and will not be repeated herein.

Provided for moving the plastic web or sheet P through the thermoforming machine is a sheet advancing system of the character described in the present assignee's U.S. Pat. 3,216,491 issued Nov. 9, 1965 for plastic sheet conveying apparatus, and also incorporated herein by reference. As FIG. 1 indicates side rail support members 25, supported from the frame F on support bar 26, mount longitudinally spaced apart stub shafts 27 on which sprockets 28 are journaled in the manner indicated in U.S. Pat. 3,216,491. Endless chains 29 trained around the sprockets 28 mount longitudinally spaced apart plastic penetrating pins 30 which are forced through the plastic web P at the longitudinal side edges thereof, and operate to advance the sheet P in predetermined increments of travel when the chain 30 is indexed in the usual manner. The chain 30 at each side of the machine extends around a front sprocket 31 mounted on a shaft 32, the shaft 32 being the drive shaft mounting a drive sprocket 33 powered by a drive chain 34 which is actuated by a double-acting fluid pressure operated cylinder 35 via a rack 36 and a clutch 37 in the manner described in the present assignee's U.S. Pat. 3,217,852, which is also incorporated herein by reference.

The cylinder 35 operates in timed relationship with the mold assembly operating cylinders 21 and 22 to index the plastic sheet P a distance corresponding substantially to the length $a$ of the mold 17 at the conclusion of each molding operation, and when the assemblies 14 and 15 have been withdrawn vertically from the sheet P.

Also mounted on the frame F upstream of the mold assemblies 14 and 15 is a plastic web heating oven generally designated 38 which includes a skeletal framework having supports 39 supporting upper longitudinal members 40 which are spanned by transverse brace members 40a. Heater support bars 41, supported by cross supports 42, mount the stationary radiant heating elements 43. At the lower end of the oven, radiant heating elements 43' are similarly mounted in stationary position. As indicated the skeletal frame of the oven which has been described is covered by side walls comprising enclosing side members 38a and a top wall or roof 38b. The tunnel housing found is open at its inlet and outlet ends.

Mounted on the side channel members 25 of frame F, which extend from one end of the machine to the other, are a series of three longitudinally spaced apart, transversely extending clamp frames generally designated C which are longitudinally spaced apart the distance $a$ which has been previously mentioned as the length of the mold members 17 and 20. Each clamp frame C includes a stationary upper member 45 which comprises a bar of square cross-section and secured to the underside thereof is a U-shaped copper tube 46 also of square cross-section. Each tube 46, as FIG. 4 indicates, includes vertically extending portions 46a extending upwardly through openings 47 in the companion support bar 45, which terminate in transversely extending ends 46b.

Figure 2:
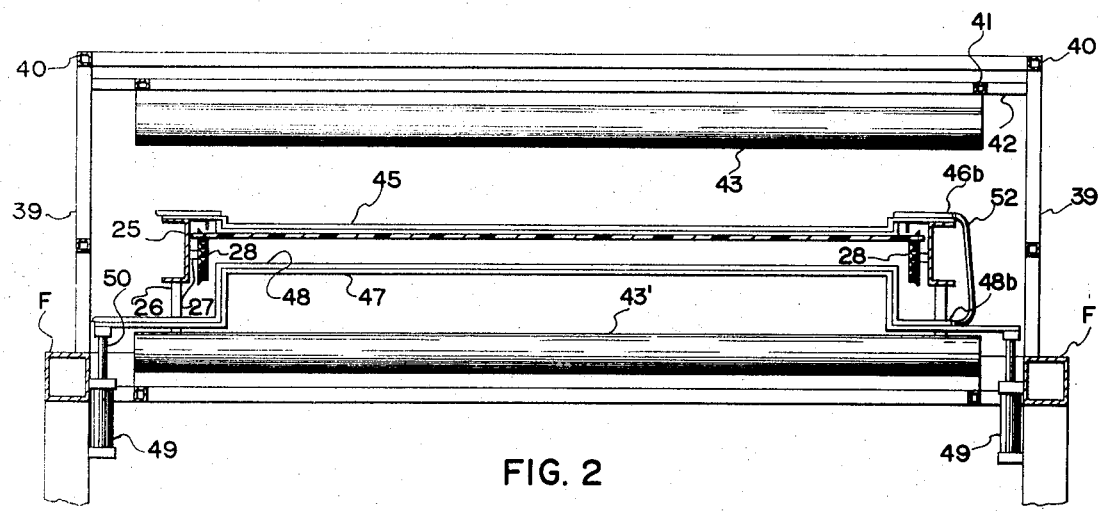
FIG. 2 is an enlarged transverse sectional view taken on the line 2—2 of FIG. 1 and showing the web clamping rails in spread apart position.

Mounted in vertical alignment with each bar 45 and tube 46 is a lower inversely U-shaped support bar 47 of square cross-section to which is attached an inversely U-shaped copper tube 48 also of square cross-section, as shown particularly in FIGS. 2 and 4. The support bar 47 and tube 48 are mounted for vertical movement by double-acting fluid pressure operated cylinders 49 secured to the framework F and having piston rods 50 which are fixed to the terminal ends 47a of the support bars 47.

As FIG. 4 particularly indicates an inlet fitting 51 is provided at the left end of each terminal end 48a of a lower tube 48. At the opposite side of the machine, the terminal end 48b of each tube 48 is connected via a flexible tube 52 (FIG. 2) with the right terminal end 46b of an upper tube 46. At the left side of the machine the other terminal end 46a of the upper tube 46 is connected with an outlet fitting 53. A circulating liquid gaseous coolant is pumped through the tubes 48 and 46 at each of the three chilling stations in a continuous manner. The tubes 48 and 46 can, for example, be connected with a source of water at room temperature and could discharge to a suitable drain.

Alternatively, a temperature controlled recirculating fluid supply system of the character disclosed in the present assignee's U.S. Pat. No. 2,994,514 may be employed to maintain the desired temperatures in the tubular clamp frames C.

In FIG. 5, I have illustrated an electrical control system which may be conveniently used. The line wires L1 and L2, which connect to a suitable power source, include circuit lines $d$ through $k$. Circuit line $d$ includes a timing cam operated limit switch 54 in series with the advance solenoid 55 of upper mold operating cylinder 21 and circuit line $e$ includes a cam operated switch 56 in series with the retract solenoid 56a of cylinder 21. Circuit line $f$ incorporates a timing cam operated switch 57 which is in series with the advance solenoid 58 of the lower mold operating cylinder 22, and circuit line $g$ includes a timing cam operated switch 59 which is in series with the retract solenoid 60 of cylinder 22.

Provided in circuit line $h$ is the timing cam operated switch 61 which, when closed, operates the advance solenoids 62 of clamp frame cylinders 49 and provided in circuit line $i$ is the timing cam operated switch 62 which, when closed, operates the retract solenoids 64 of cylinders 49. While three cylinders 49 are shown in FIG. 1 and only one is shown in FIG. 5, it is to be understood that the other two cylinders 49 will be electrically connected in exactly the same way as the cylinder 49 shown in FIG. 5, to operate in unison therewith. Circuit line $j$ has a timing cam operated switch 65 which, when closed, energizes the retract solenoid 65 of sheet advancing cylinder 35 to cause the advancing movement of the sheet P, and circuit line $k$ includes the timing cam operated switch 67 which, when closed, energizes the advance solenoid 68 of cylinder 35 and returns the rack 36 to the position shown in FIG. 1. While in the system disclosed, conventional timing cams such as in a Gemco system are utilized to operate the various power cylinders in proper sequence, it should, of course, be understood, that limit switches in the path of the various moving elements could as easily be used to operate the various elements in proper sequence.

THE OPERATION

As the plastic web P proceeds in incremental movements followed by periods of dwell through the oven enclosure 38, it is gradually heated to a forming temperature suitable to permit the mold assemblies 14 and 15 to form three dimensional articles such as containers in the web during the periods of sheet dwell. The clamp frame assemblies C are uniformly spaced apart and operate to maintain the same transverse strips $x$ (see FIG. 6) in a cooled and set condition in which they tend to rigidify the sheet. In other words, the distance $a$ between the cooled and relatively rigid strips $x$ is the distance $a$ maintained between the clamp frames C so that the strip $x$ which is cooled by the first clamp frame assembly C is the same strip or zone of the web P cooled by the subsequent clamp assemblies C. The sheet advancing cylinder 35 moves the plastic web P a distance $a$ then in each indexing movement.

FIG. 7 illustrates a portion of a web P which is not treated in any way to inhibit sag, while FIG. 8 illustrates a plastic web P in which the strip portions $x$ have been maintained and the sag has been considerably reduced. As the sheet P enters the oven 38 it is, of course, generally at room temperature and is in a relatively rigid state as distinguished from the heat softened soft state required for molding. Actually, of course, the sheet P is quite thin and flexible in its normal state, but the difference is that it will not stretch and sag under its own weight at normal room temperatures as it will when it approaches its molding temperature. The clamp frame assemblies C operate to maintain strip portions $x$ in or near to the relatively "set" or comparatively rigid condition the entire sheet P is at the time of entry into the oven 38. This is done by the clamp frame C removing heat from the zonal strips $x$ which has been imparted to them by the immediately preceding heating elements. It has been determined that if the cooled clamp frames C are spaced apart the distance $a$ in the manner disclosed in FIG. 1, the zonal areas $x$, may be maintained at a temperature such as to achieve the effect illustrated in FIG. 8.

Figure 3:
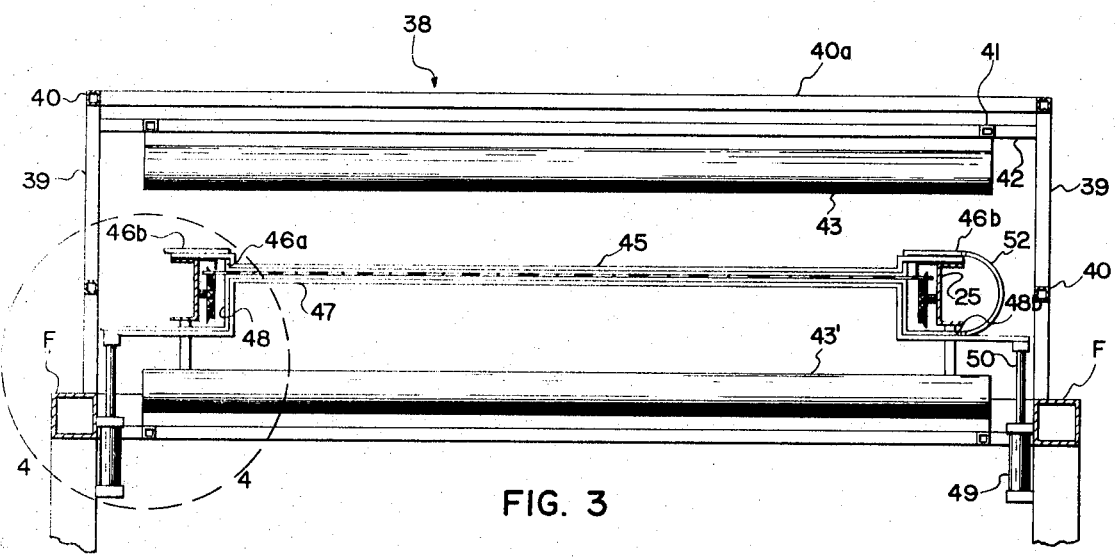
FIG. 3 is a similar view with the rails being shown clamping the heated web.

In practice, the retract solenoid 66 in circuit line $j$ is first energized with the closing of switch 65 by its timing cam to power the advancing chains 29 and advance the sheet P a distance $a$. Clutch 37 is then disengaged and the rack 36 may be returned to the position shown in FIG. 1. This occurs with closing of the switch 67 and energization of the rack advancing solenoid 68. Thereafter, the sheet remains stationary and switches 54 and 57 are closed to energize solenoids 55 and 58 and cause cylinders 21 and 22 to advance the mold assemblies 14 and 15 to a closed position in which they clamp the web between them and subsequently differential pressure form three dimensional articles therein in the manner disclosed in the aforementioned Pat. No. 3,216,491. At the same time, or shortly after, the mold assemblies 14 and 15 close the switch 61 energizing the solenoids 62 of the double acting air cylinders 49 to operate cylinders 49 and advance the piston rods 50 thereof so that the tubular lower members 48 move up toward the tubular upper members 46 to the position illustrated in FIG. 3. The clamping engagement secured is what may be termed a very "light" clamping engagement and is not sufficient to compress or mark the web P in any material or noticeable manner. It is sufficient for the members 46 and 48 to fully engage the plastic web P and to remove enough heat in so doing to maintain the strips $x$ in a comparatively rigidified condition relative to the mediate portions of the web, in which the articles are to be formed, at the molding station. At the completion of the molding cycle, the switches 56 and 59 are closed to energize retract solenoids 56 and 60 and cause cylinders 21 and 22 to retract the upper and lower mold assemblies 14 and 15, respectively. At the same time, the switches 63 are closed to energize the retract solenoids 64 of the double acting air cylinders 49 and return the members 48 and 47 to the position shown in FIG. 2. Thereafter, the cycle is, of course, continuously repeated.

It is to be understood that normally the upper tubular member 46 is in a position adjacent to but just out of contact with the plastic sheet P, the members 48, when they move upwardly, moving the plastic sheet P upwardly into engagement with the tubular members 46.

It is to be understood that various changes may be made in the various elements described to accomplish the same or similar purposes without in any way departing from the scope of the invention which is defined in the appended claims.

I claim:

1. Apparatus for forming articles in synthetic plastic webs comprising: a frame system; means thereon for advancing a web along a longitudinal pathway; heating oven apparatus having an inlet and an outlet and supported by said frame having an inlet and an outlet and supported by said frame system to extend along said pathway for heating the web; relatively closeable and openable mold mechanism supported by the frame system downstream of the outlet of the oven apparatus for forming articles in the said web; means for opening and closing the mold mechanism; and means between the inlet and outlet end of said heating oven apparatus for providing relatively rigidified, longitudinally spaced apart, transversely disposed strip portions in transversely central portions of said web extending inward from the longitudinal edge portions thereof, during the time it is being heated, to inhibit sagging of the heated web in the oven under its own weight.

2. The combination defined in claim 1 in which said latter means comprises a plurality of longitudinally spaced clamp frames; means is provided for clamping said frames to and unclamping said frames from the web; and means is provided for circulating a coolant fluid through said frames.

3. The combination defined in claim 2 in which said clamp frames are spaced apart a distance slightly greater than the longitudinal extent of said mold mechanism.

4. The combination defined in claim 2 in which said clamp frames comprise top tubular bars disposed just above said pathway and lower tubular bars normally disposed just below said pathway; and fluid pressure operated motors are provided for moving the lower bars toward the upper bars and clamping the web between the upper and lower bars.

5. The combination defined in claim 4 in which said motors are operated to clamp said web between the clamp frames at substantially the time said means is operated for closing the mold mechanism.

6. The combination defined in claim 2 in which said web advancing means includes a motor operated to advance said web an increment followed by a period of dwell; and said means for clamping said frames to the web is operated following each operation of said motor to advance the web.

7. Apparatus for forming articles in synthetic plastic webs comprising: a frame system; means thereon for advancing a web along a longitudinal pathway; heating oven apparatus having an inlet and an outlet and supported by said frame system to extend along said pathway for raising the web to a forming temperature; relatively closeable and openable mold mechanism supported by the frame system downstream of the outlet end of the oven apparatus for forming articles in the said web; means for opening and closing the mold mechanism; and closed system, coolant conducting means extending transversely inwardly from the advancing means and edge potrions of the web inside the oven between the inlet and outlet end of said heating apparatus for providing relatively rigidified, longitudinally spaced apart, transversely disposed rigid portions in said web inward of the longitudinal edge portions thereof, during the time the web is being heated, to inhibit sagging of the heated web in the oven under its own weight.

References Cited

UNITED STATES PATENTS 3,359,600    12/1967    O'Brien et al. _____ 18—DIG 48

J. SPENCER OVERHOLSER, Primary Examiner

D. S. SAFRAN, Assistant Examiner

U.S. Cl. X.R.

425—384, 174, 397